April 16, 1957
E. R. FRYER ET AL
2,788,999
PUSHER BUMPER FOR LEVER TYPE SCRAPER
Filed April 23, 1952
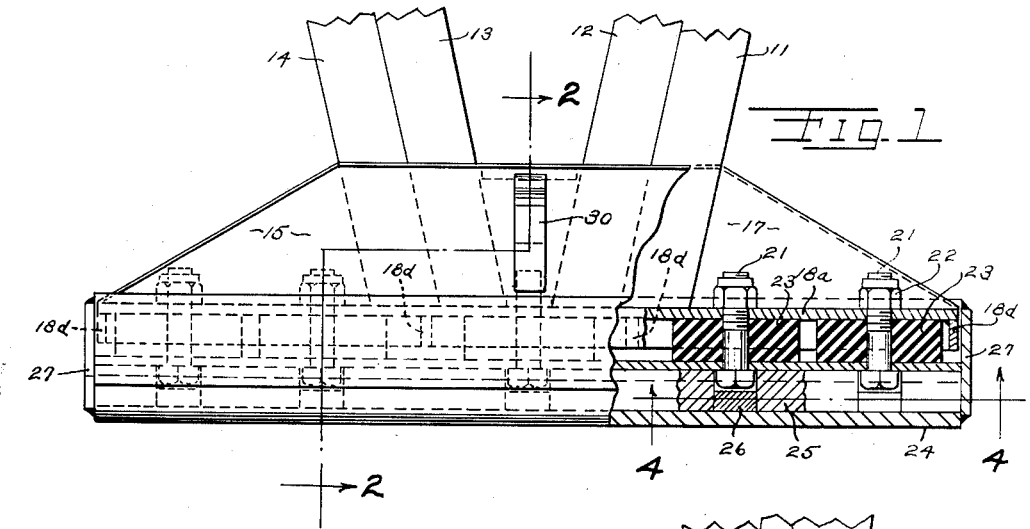
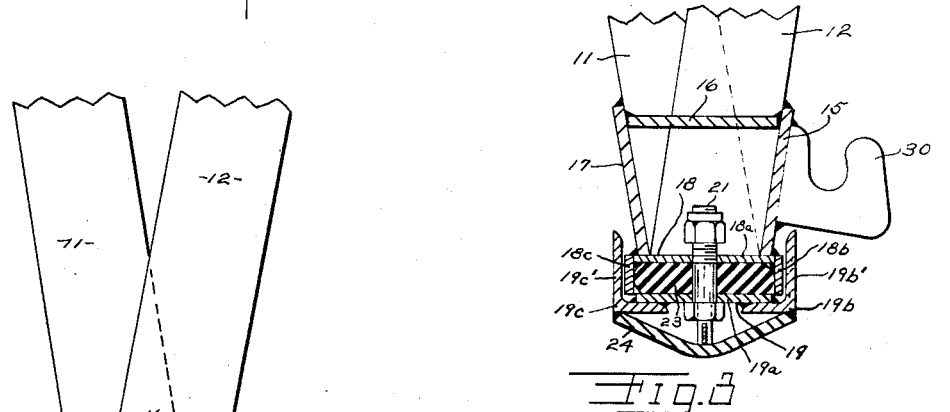
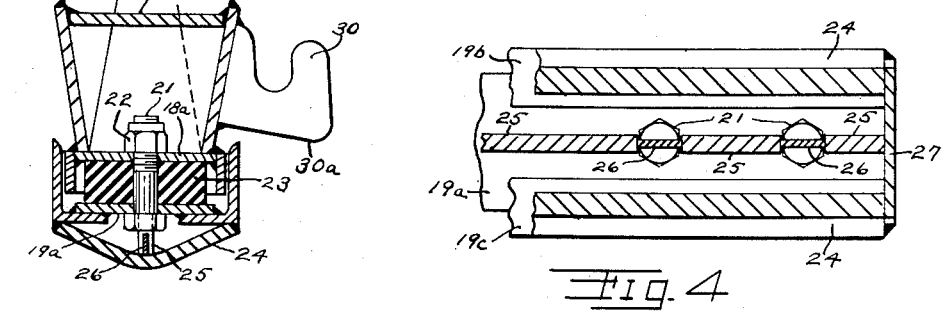
INVENTOR.
EDWARD R. FRYER
WILLIAM J. ADAMS
BY
Hyde, Meyer, Baldwin & Doran
ATTORNEYS

United States Patent Office 2,788,999
Patented Apr. 16, 1957

2,788,999

PUSHER BUMPER FOR LEVER TYPE SCRAPER

Edward R. Fryer, Willoughby, Ohio, and William J. Adams, Santa Cruz, Calif., assignors, by mesne assignments, to General Motors Corporation, Detroit, Mich., a corporation of Delaware Application April 23, 1952, Serial No. 283,949

2 Claims. (Cl. 293—88)

This invention relates to improvements in vehicle bumpers and more particularly to a bar type cushioned pusher bumper.

One of the objects of the present invention is to provide, in a vehicle bumper of the type described, telescoping bar-like members with resilient means therebetween normally urging them into separated relationship.

Another object of the present invention is to provide a pusher type vehicle bumper low in cost to manufacture, extremely rugged and completely cushioned to absorb impact shock between vehicles.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a top view of the pusher bumper with a portion thereof broken away to show some of the elements in section;

Fig. 2 is a vertical sectional view taken along the line 2—2 of Fig. 1 showing the bumper elements in their separated, unloaded condition;

Fig. 3 is a sectional view similar to Fig. 2 but showing the bumper elements in the position assumed when a pushing load is exerted on the bumper; while Fig. 4 is a vertical sectional view taken along the line 4—4 of Fig. 1.

Those familiar with this art will recognize that this invention in a bar type pusher bumper may be used on many types of vehicles as either the front or rear bumper thereof. But we have chosen to illustrate this bumper in connection with a lever type digging and carrying scraper, such as the one shown in our copending U. S. patent application Serial No. 287,772, entitled, Digging and Carrying Scraper, filed May 14, 1952.

A digging and carrying scraper of the aforementioned type may be loaded with dirt or other material by being push-loaded with a pusher tractor engaging the rear bumper for pushing the scraper forwardly during the loading operation. It is desirable to have the cushion construction in either the rear bumper of the scraper or the front bumper of the pusher tractor to absorb the push-loading shock. This bumper not only must be rugged and able to stand tremendous abuse, but also must be able to keep the scraper being push-loaded and the pusher tractor lined up in effective digging relationship.

The general construction of the rear part of the scraper and the pusher bumper is especially rugged to take the tremendous abuse it must endure. The scraper or vehicle has rearwardly extending frame members 11, 12, 13 and 14 of rigid construction arranged in pairs and adapted to support the rear bumper. A box beam construction is formed at the rear of these frame members by plates 15, 16 and 17 welded to each other, to either the upper or lower surfaces of each of the four frame members, and to the forward side of the rear bumper, which forms the fourth side of the rigid box beam construction.

The bar type pusher bumper disclosed herein consists of two spaced, elongated, bar-like members 18 and 19, extending in the same direction and being approximately coextensive. These members form a box beam in section and are each composed of a rigid, channel-shaped member of U-shaped cross section having a web and edge flanges with said flanges forming the opposite parallel legs of the U-shape. Member 18 has a plate 18a forming the web with plates 18b and 18c secured thereto by welding to form the edge flanges. Member 19 has a plate 19a with elongated members, each L-shaped in section and shown at 19b and 19c, welded to each end thereof. The web of member 19 includes the plate 19a and the horizontal legs of members 19b and 19c in Fig. 3 while the edge flanges are the vertical legs of members 19b and 19c shown as 19b' and 19c' in Fig. 3. Flanges 18b, 18c of member 18 fit within flanges 19b' and 19c' of member 19 so that members 18 and 19, forming the box beam structure of the bumper, can telescope laterally one within the other. The outer member 19 can slide back and forth over the inner member while web 18a and plate 19a, forming the web of member 19 always form respectively the front and back surfaces of the box beam structure.

Means is provided for connecting together members 18 and 19 for limited telescoping movement toward and away from each other. In the present disclosure, this takes the form of four bolts spaced along the length of members 18 and 19. A fifth bolt is located in line with the four aforementioned bolts in the center of the bumper, but it is not used to connect sections 18 and 19. Each of the four outer bolts extends through aligned holes in web plates 18a, 19a and extends through the box beam section in the direction of telescoping movement. These four bolts each engage with a nut element 22 to hold members 18 and 19 together.

Each bolt has stop means for limiting the relative separation of members 18 and 19. The stop means on each of said four bolts includes a nut element 22 screwed onto the threaded bolt shank and a bolt head element on the opposite end of the bolt. These elements engage the outside surfaces of flange plates 18a and 19a (Fig. 2) to serve as stop means for limiting their relative separation. Nut 22 should preferably be of the self-locking type. This will insure a constant distance between the nut and the bolt head and thus control the relative separation between members 18a and 19a which are held between the nut and bolt head.

Resilient means is provided between web plates 18a and 19a for normally urging members 18 and 19 into their separated relationship (Fig. 2) against the spaced stop means elements. In the present disclosure, this resilient means, shown at 23, takes the form of an annular block of rubber-like material surrounding each bolt 21 (the four bolts having nuts 22 and the central or fifth bolt serving as a locator for the central resilient means 23). The annular resilient blocks are equally or evenly spaced along substantially the entire lateral length of the bumper and are located between the web plates 18a and 19a and the spaced edge flanges 18b, 19b' and 18c, 19c' These annular blocks 23, serving as resilient cushions, are accurately located and prevented from shifting within the channel-shaped members by the bolts 21, wherein a bolt 21 passes through a central hole in each cushion to centrally locate its associated cushion and to securely hold it in place at all times.

The rubber cushions 23 are encased in pockets. Vertical spacer bars 18d, 18d are welded to the plates of member 18 at intervals along its length. These bars 18d together with the flanges and webs of members 18 and 19 provide pockets for surrounding the rubber cushions 23 to encase them within the bumper. The bolts 21 are located in these pockets so as to space each cushion 23 from the surrounding pocket wall to permit sufficient room for expansion of each cushion 23, as shown by comparing Figs. 2 and 3 of the drawings, when the web plate 18a and 19a of the bumper are pushed toward each other when the pushing tractor drives the scraper forwardly. The central location of each cushion 23 by its associated bolt 21 allows for equal expansion and equal contraction in all directions around the entire circumference of each cushion. Hence, each cushion 23 can do its maximum cushioning job, and because each cushion can equally expand over its whole circumference, the working life of these cushions will be increased.

Since this type of pusher bumper must take tremendous abuse and must be extremely rugged, adequate reinforcement must be provided to make sure that only the parts best able to take the pushing load receive it. An outwardly arched plate 24 is secured to the outside or rearward surface of member 19. This plate, shown at 24 of the drawings and being substantially co-extensive with the web of member 19, has its elongated opposite side edges welded to opposite side edges of the web of member 19, as shown in Figs. 2 and 3. This construction provides a smooth outside contour to the bumper with plate 24 welded securely to member 19b and 19c. The plate 24 is arched convexly outwardly to provide a strong structure to take the pushing load from the pusher tractor bumper and to cover the bolt head elements to shield them from the full pushing force. Between each bolt head element is located a relatively thick plate 25 welded to the web plate 19a and extending up to and in contact with the underside of the arch formed by plate 24 so as to support the arch when the pushing load is applied and to transmit this pushing load directly to the rubber-like cushions 23. The edges of these plates 25 straddle the bolt head elements and prevent their turning, as shown in Fig. 4, since a wrench could not be inserted therein to hold them during assembly or during the adjustment of the stress on cushions 23 by screwing nuts 22 on the threaded shanks of bolts 21. Spacer plates 26 are welded to the ends of plates 25 and are located above the bolt head elements to prevent any axial movement thereof.

Other reinforcement is also provided. At opposite ends of the plate 24 there are provided end plates 27, 27 welded to plate 24 and members 19b and 19c. These end plates 27 not only shield members 18 and 19 from entry of dirt therebetween but also help in forming a rigid structure. The four vertical spacers 18d, previously mentioned, are welded to the plates 18a, 18b and 18c of the member 18 to make its channel-shaped section more rigid.

The operation of the novel bumper should now be readily apparent. When the front bumper of the pusher tractor engages the arched plate 24, when starting to urge the scraper forwardly for push-loading, the bumper elements move from the position shown in Fig. 2 to that shown in Fig. 3 with the rubber-like cushions 23 absorbing any sudden shock when the bumpers make contact and absorbing any variations in the pushing load during push-loading.

Several parts of the bumper perform dual functions. The flanges 18b, 18c, 19b' and 19c' guide members 18 and 19 in their telescoping, sliding movement and also form some of the walls of the pocket housing the rubber-like cushions 23. Also, the vertical spacers 18d tie together the plates 18a, 18b and 18c of the channel-shaped members for reinforcement and provide some of the walls of the pockets housing the cushions 23. Also, plates 25 not only reinforce the arch formed by plate 24 but also prevent turning of the bolt heads on bolts 21.

For convenience, a hook 30, projecting in a generally vertical direction, may be welded to the plate 15 of the bumper structure so that the scraper can be pulled rearwardly by a tow line if necessary. This hook has another function when a bulldozer is used for push-loading the scraper. Its rear surface 30a acts as a stop means or tire protector in case the bulldozer pusher operator is careless, and the bulldozer blade was held high enough at the start of the pusher operation, so the blade could slide up the curved rear plate 24 of the bumper and then on up the top rear scraper struts 11 and 14 far enough to damage the rear scraper tires. The rear surface 30a of the hook sloping rearwardly and outwardly in Fig. 2, will engage the force transmitting surface of the bulldozer blade to prevent its forward travel beyond this point during any vertical misalignment between the bumper and the blade.

Although the present disclosure shows the different parts as being composed of plates and other members welded together, it should be realized that this invention contemplates either that other securing means in place of a weld can be used or that two or more components can be made as an integral unit to elimintae the need for a weld.

Various changes in details and arrangement of parts can be made by one skilled in the art without departing from the spirit of this invention or the scope of the appended claims.

What we claim is:

1. A vehicle bumper, comprising two bar-like members telescopically related, bolt means passing through said members in the direction of telescopic movement and holding them in telescopic relationship, a bent elongated plate secured to the outside one of said members and covering the bolt means passing through so as to enclose and protect it from bumping contact, each bolt means including a bolt with a bolt head element and a nut element, one of said elements being enclosed by said plate, and means to prevent turning of said last mentioned element incluing a rigid brace engaging said plate intermediate the lateral edges thereof, engaging said one member and engaging said one element.

2. A bar type pusher bumper for a vehicle, comprising two spaced elongated bar-like members, each member being U-shaped in cross section with parallel legs and a connecting web, the openings of the U-shapes facing each other and the legs of one member being located between the legs of the other member to form a box beam in section to permit telescopic relative movement therebetween, a plurality of bolts extending through the webs of said box beam section in the direction of said telescoping movement and being spaced along the length of said members and being longitudinally slidably mounted with respect to only said one member, each bolt having a nut element located outside said one member and a bolt head element located outside said other member for engaging said members for limiting their relative separation, an outwardly arched plate substantially co-extensive with the web of said other member and having its opposite side edges welded to the opposite side edges of said last mentioned web to enclose and protect said bolt head elements, an annular cushion of resilient material surrounding each bolt with its outer periphery spaced laterally in bumper unstressed condition from its adjacent cushion and legs of said one member and capable of lateral expansion during approach movement of said members and located between said webs for normally urging said members into separated relationship against said elements and located between the legs of said one member and constructed so that it will not contact the relatively moving outer legs on said other member during lateral expansion caused by approach movement of said members, and rigid brace plates engaged against the concave surface of said arched plate, the outer surface of the web on said other member, and said bolt head elements to prevent turning of said bolt head elements during assembly or disassembly and to brace the arched plate during bumping contact.

References Cited in the file of this patent

UNITED STATES PATENTS

| | | | |
|---|---|---|---|
| D. 113,691 | Van Auken | Mar. 7, | 1939 |
| 1,602,922 | Midboe | Oct. 12, | 1926 |
| 1,636,248 | Schuette | July 19, | 1927 |
| 1,949,528 | Brown | Mar. 6, | 1934 |
| 2,128,221 | Dean | Aug. 30, | 1938 |
| 2,213,455 | Abkowitz | Sept. 3, | 1940 |
| 2,251,347 | Williams et al. | Aug. 5, | 1941 |
| 2,304,527 | Armington et al. | Dec. 8, | 1942 |
| 2,492,914 | Barden | Dec. 27, | 1949 |
| 2,593,586 | Maag | Apr. 22, | 1952 |
| 2,598,762 | Dath | June 3, | 1952 |

FOREIGN PATENTS

| | | | |
|---|---|---|---|
| 1,817 | Great Britain | May 6, | 1878 |